Patented Oct. 18, 1949

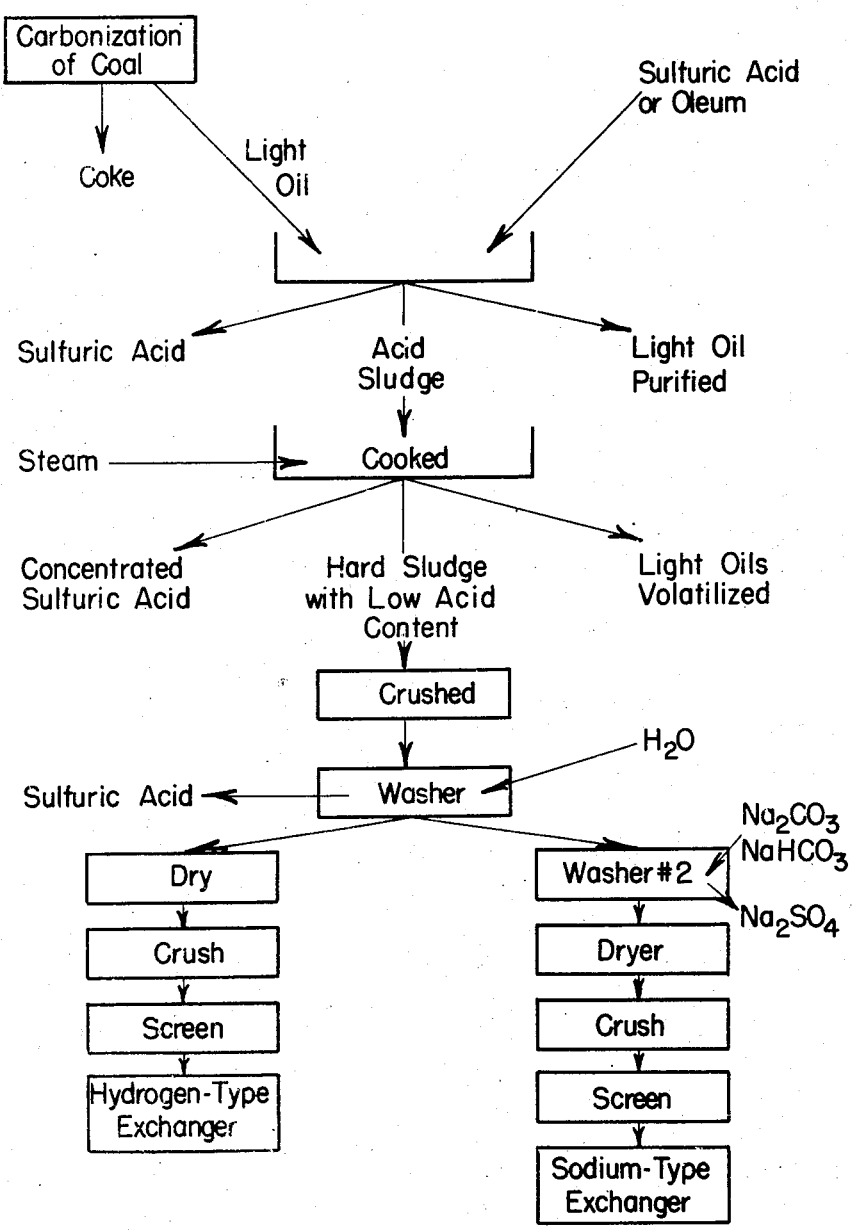

2,485,352

UNITED STATES PATENT OFFICE 2,485,352

METHOD OF MAKING AN ION-EXCHANGE MATERIAL FROM LIGHT OIL ACID SLUDGES

John R. Bircher, Jr., Columbus, Ohio, assignor, by mesne assignments, to Interlake Chemical Corporation of Delaware, Cleveland, Ohio, a corporation of Delaware Application September 7, 1946, Serial No. 695,501

2 Claims. (Cl. 252—179)

This invention relates to ion-exchange materials consisting essentially of sludge produced by the acidification of light oil derived from the carbonization of coal, and to methods for producing such materials.

Ion-exchange materials, such as artificial and natural zeolite, have been used for a considerable period of time principally in the water-softening industry. A number of new uses for these ion-exchange materials have arisen in the past few years which require greater amounts of the ion-exchange materials at lower costs. The present problem in the production of ion-exchange materials from a commercial standpoint, is the low-cost production of ion-exchange materials from cheap source ingredients while maintaining high efficiency as an exchanger. The so-called carbonaceous zeolites, which are manufactured by treating carbonaceous matter with concentrated sulfuric acid, have been proposed as one answer to this problem, but these carbonaceous zeolites are not completely satisfactory either from the point of ion-exchange properties or cost.

It is an object of this invention, therefore, to provide an ion-exchange material that is inexpensive and which is highly efficient as an ion-exchange material.

Another object of this invention is to provide a method of converting a waste product of the coal carbonization industry into an ion-exchange material.

Other objects and advantages of this invention will become apparent from the following detailed description thereof when read in conjunction with the accompanying drawing, in which the single figure represents a flow sheet of the production of the ion-exchange material comprising the present invention.

It has been found that very satisfactory ion-exchange materials may be produced from the sludge resulting from the acidification of light oils derived from the carbonization of coal. Coal is carbonized to produce coke and various by-products, among which is a light oil consisting essentially of homologous members of the benzene series of hydrocarbons and alkylated derivatives, together with a very small amount of dissolved alkanes, alkenes, and alkines. This light oil is originally present in the vapor form and is recovered from the gas stream by means of an absorption oil, from which it is later stripped by means of live steam. In order to remove certain impurities from the light oil, it is the present practice to treat it with oleum (20% $SO_3$+80% of 100% $H_2SO_4$) or concentrated sulfuric acid or both. Following this treatment three layers form upon standing, the bottom consisting essentially of sulfuric acid, the middle layer being an acid sludge formed by the reaction of the acid with the impurities in the light oil, especially the unsaturated compounds therein, and the top layer being the purified light oil. Heretofore, the sulfuric acid was drained off, followed shortly by the acid sludge layer which, due to its high acid content, had to be specially treated and carted off at considerable expense to the manufacturer.

It is this acid sludge, which formerly was an unwanted waste product, that forms the raw material for the ion-exchange material of the present invention. There is a considerable variation in physical properties of this acid sludge derived from the acid treatment of light oil, due to the variation in composition of the coal carbonized and the particular treatment given the acid sludge or light oil in each different plant. In spite of the relatively wide variations in composition and physical characteristics of these acid sludges, all of the acid sludges derived from the acid treatment of coke oven light oil may be successfully treated in accordance with the method herein disclosed to produce ion-exchange materials.

As shown in the figure, the acid sludge produced as a result of the acidification of the light oil is introduced in its highly viscous state into a "cooker," which is a lead-lined vessel heated preferably by steam coils and in which are disposed a number of spargers through which steam is forced under pressure. The live steam which is forced through the spargers and up through the acid sludge in the cooker removes the light oils or any other volatile unreacted material from the sludge so as to aid in the concentration of the sulfuric acid which, because of its greater specific gravity, collects at the bottom of the cooker and is drained off. The temperature in the cooker is preferably maintained at some point between 212° F. and 300° F., although slight variations above or below these temperatures are not material. The higher temperatures within this range are generally more satisfactory from a commercial standpoint, since they decrease the dilution of the acid. The length of cooking necessary to satisfactorily treat any particular batch of acid sludge varies considerably, that is, from about 12 to about 56 hours, although one criterion which is indicative of the point at which the cooking is complete is that stage at which the sludge will just barely flow from the cooker.

Upon cooling, the sludge from the cooker which has been largely freed of its acid content becomes quite hard and brittle and may be easily crushed prior to washing with water. The crushed sludge is washed with water in a vessel provided with a means of positive agitation. The water is removed from the slurry by filtration, using suction filters, centrifugal filters, or other type of filtering device. Following the initial removal of water, the residue on the filter may be given additional water washes. The degree to which the sludge is freed from the remaining acid contained therein is not material after that point has been reached where only 0.3–0.05% of acid remains therein.

At this point in the process, the sludge material has become a hydrogen-ion type ion-exchange agent, and, if it is to be used in this form, is then dried, crushed and screened to size. Usually, however, some other active form, such as the sodium form, is desired in water-softening processes. The hydrogen-ion type sludge may be converted to the sodium form by treatment with sodium salts in the usual manner. A number of sodium salts may be employed in this process, for example, sodium chloride, sodium carbonate, sodium bicarbonate, etc.

In order to better enable those skilled in the art to practice the present invention, the following examples representing various embodiments thereof are set forth:

Example 1

A 500-gram sample of an acid sludge obtained in the treatment of crude coke oven light oil (boiling up to 185° C.) with 20% oleum (20% $SO_3$+80% of 100% $H_2SO_4$) was heated in a lead-lined cooker by means of coil steam and open steam for a period of 30 hours at temperatures varying between 212° F. and 312° F. At the end of the heating period, the steam was shut off and the dilute acid was withdrawn from the cooker. The treated sludge was then poured from the cooker and allowed to cool, at which time it was broken up and washed with water in three separate washes, each wash containing water equal to about twice the volume of the steamed sludge being treated. The washed sludge was then neutralized and converted into the sodium form of ion exchanger by treatment with a sodium carbonate solution of about 10% concentration and equal in quantity at least to the volume of the material being treated. The excess alkali was removed by further water washing, and the finished ion-exchange material was dried and screened. From about 250 to about 300 grams of finished ion-exchange material were obtained from the original 500 grams of acid sludge treated.

Example 2

A procedure identical with that employed in Example 1 was followed in this example with the exception that 66° Bé. sulfuric acid was used in place of the 20% oleum employed in Example 1. The acid sludge treated was approximately the same composition as that treated in Example 1, and between 200 and 250 grams of the finished ion-exchange material were obtained by this manner of treatment.

Example 3

A 500-gram sample of acid sludge was obtained in treatment of the crude benzol-toluol-xylol fraction of the light oil resulting from the carbonization of coal which boils at a range from 50° C. to 150° C. with a mixture of 66° Bé. sulfuric acid and 20% oleum in equal portions in a manner similar to that employed in Examples 1 and 2. Further treatment of this sample also followed the procedure set forth in Examples 1 and 2 and the final product amounted to between 35 to about 45%, by weight, of the original acid sludge treated.

The working capacities of ion exchangers derived from the coke oven light oil acid sludges usually are about 7500 to 9000 grams per cubic foot of exchanger, although much higher capacities may be obtained with some of the acid sludges. A feature characteristic of these ion-exchange materials is their detergent effect.

By practicing the method of this invention, a waste material, which operators of coal carbonizing plants have heretofore been burdened with the expense of disposing, is converted to a highly useful ion-exchange material having marked ion-exchange activity. Since there exists quite large quantities of acid sludges as by-products of the treatment of light oils derived from the carbonization of coal, there is sufficient quantity of these sludges to produce enough ion-exchange material to satisfy demands of large industries which employ ion exchangers in quantities of several tons.

It will be obvious to those skilled in the art that a number of variations may be made in the procedures hereinabove outlined without departing from the scope of the present invention. For example, ion-exchange material may be produced from acid sludges of the type herein referred to without cooking the sludge first produced upon treatment with sulfuric acid. However, ion exchangers so prodced are greatly inferior in ion-exchange activity to those produced by cooking the sludge in the presence of sulfuric acid as hereinabove set forth. Other means of heating the acid sludge in the cooker than by steam coils and by live steam may be employed, although the means above set forth are preferred. Examples of other heating means are electrical heaters, hot water under pressure, hot air, and the like.

The words "an active form," as used throughout the specification and the attached claims, refer to ion exchangers which have been so treated as to adsorb those ions to be removed from solution.

What is claimed is:

1. A method of producing an ion exchange material, which comprises treating with sulphuric acid the light oil derived from the carbonization of coal to produce a sludge that is insoluble in sulphuric acid, separating the sludge from the other components, cooking the sludge by subjecting it to direct contact with steam at temperatures between 212° F. and 300° F. to remove volatiles, and washing the cooked sludge until not more than about 0.3% acid remains.

2. A method of producing an ion exchange material, which comprises treating with sulphuric acid the light oil derived from the carbonization of coal to provide three layers in the reactant vessel including a lower layer of sulphuric acid, a middle layer of sludge and an upper layer of light oil, withdrawing the middle layer of sludge, cooking the sludge by subjecting it to direct contact with steam at temperatures ranging from 212° F. to 300° F. in order to remove volatiles therefrom, and washing the sludge to remove free-acid until not more than 0.3% free-acid remains therein.

JOHN R. BIRCHER, Jr.

REFERENCES CITED

The following references are of record in the file of this patent:

UNITED STATES PATENTS

| Number | Name | Date |
|---|---|---|
| 2,191,060 | Liebknecht | Feb. 20, 1940 |
| 2,337,500 | Savelli | Dec. 21, 1943 |